United States Patent [19]

Sanford et al.

[11] Patent Number: 5,375,694

[45] Date of Patent: Dec. 27, 1994

[54] VIBRATORY FEEDER

[75] Inventors: Philip H. Sanford, Walpole; Edward A. Packard, Plymouth, both of Mass.

[73] Assignee: Hyer Industries, Inc., Pembroke, Mass.

[21] Appl. No.: 107,230

[22] Filed: Aug. 16, 1993

[51] Int. Cl.[5] .............................. B65G 27/00
[52] U.S. Cl. ............................................ 198/771
[58] Field of Search ................. 198/771, 754, 763, 11

[56] References Cited

U.S. PATENT DOCUMENTS

| | | | |
|---|---|---|---|
| 905,865 | 12/1908 | Frister | 198/771 |
| 3,015,308 | 1/1962 | Beresford | 198/771 |
| 3,087,602 | 4/1963 | Hinkle | 198/759 |
| 3,139,974 | 7/1964 | Roder | 198/763 |
| 3,199,664 | 8/1965 | Baker | 198/763 |
| 3,228,517 | 1/1966 | Yeasting | 198/759 |
| 4,174,776 | 11/1979 | Kreimer et al. | 198/771 |
| 4,482,046 | 11/1984 | Kraus | 198/771 |
| 4,787,502 | 11/1988 | Sullivan et al. | 198/771 |
| 4,821,782 | 4/1989 | Hyer | 141/83 |

Primary Examiner—Joseph E. Valenza
Attorney, Agent, or Firm—Lahive & Cockfield

[57] ABSTRACT

A vibratory feeder for cohesive particulate solids such as powders and the like. A conveyor frame supports a flexible conveyor membrane and is excited by a vibrator. The vibrator produces standing waves defined by nodes in the sectional configuration of the membrane transverse to the direction of material flow, with the sections between the nodes effecting periodic, alternately inverting flexures to release adhering solids.

6 Claims, 2 Drawing Sheets

VIBRATORY FEEDER

BRIEF SUMMARY OF THE INVENTION

This invention relates generally to vibratory tray feeders for particulate cohesive solids such as powders that tend to agglomerate on feeder surfaces and feed erratically, making it difficult to attain uniform rates of flow. More particularly, it relates to a vibratory feeder tray construction adapted to prevent material agglomeration, adhesion and buildup on the surfaces of the tray.

A primary object of this invention is to provide a vibratory feeder for uniform precision feeding of materials that are difficult to feed at relatively low feed rates. Applications include the feeding of powders of vitamins, certain vitamin progenitors such as beta carotene, and titanium dioxide, which are among the materials that have a strong tendency to agglomerate, adhere and build up upon the surfaces of vibratory tray feeders currently in use.

Such tray feeders are equipped with vibrators that impart motions having components both vertical and longitudinal to the feeding direction of the material on the tray, thus providing a progressive motion. When the material is pitched forward in response to the vibrations, forces of compaction result in a tendency for the material to build up in layers. The layers are cohesive and may build in thickness at a rate of up to 1/16 inch per minute. These layers tend to adhere to the tray surface, thereby impeding the flow and building up bodies of non-moving material.

Attempts have been made to prevent such adhesion and buildup, including the use of electropolished tray surfaces and the application of various kinds of coatings to the tray surfaces. One such coating is polytetrafluoroethylene, a material that normally resists adhesion to other materials. However, these attempts have proven unsuccessful with powders which tend to agglomerate and adhere, particularly when very low rates of feed are attempted.

U.S. Pat. No. 4,482,046 to Kraus, dated Nov. 13, 1984, addresses the problem of conveying materials such as damp, sticky foundry sand which has a tendency to build up and adhere to the surfaces of vibratory conveyor troughs. This patent describes a vibratory, material-carrying, flexible member that changes its static shape as the conveyor vibrates. The flexible member is in the form of conveyor belting material, woven material, light gauge flexible steel membranes, or fiber reinforced flexible plastic sheeting. The flexible member is described as having "substantially little or no elongation when loaded with material." The member is described as having a major part downwardly-curved in the form of a catenary, being attached to the conveyor frame so that the outer edge portions are tangent to and secured to the side members of the conveyor frame.

We have conducted experiments with flexible members having the configuration described by Kraus, which are characterized by a smooth downward curvature having no points of inflection in the loaded or unloaded state and in either the static or vibrating state. In general, these experiments were unsuccessful in providing satisfactory feeding according to the objects of the present invention.

With the foregoing objects in view, the features of this invention include a novel form of conveyor comprising a frame and a conveyor membrane of flexible sheet material mounted thereon which, in the non-vibrating or static condition, curves and inflects downwardly and inwardly to form a trough.

Another feature of the invention is that the vibrator operates at a frequency causing the said transverse sectional configuration of the flexible membrane to form standing waves which resonate at four nodes, the portions of the membrane between said nodes effecting periodic alternately inverting flexures. The flexures fracture and shed the adhered skin of particulate material as it tends to form on the surface of the flexible membrane.

According to another feature, the membrane may comprise elastomeric material having stretchable characteristics, whereby the alternate stretching and contraction of the elastomer surfaces further aids in fracturing and shedding the material as it tends to form layers thereon.

Other features of the invention relate to details of construction and modes of operation that will become evident from the following description of a preferred embodiment, having reference to the appended drawing.

DETAILED DESCRIPTION

Figure 1:
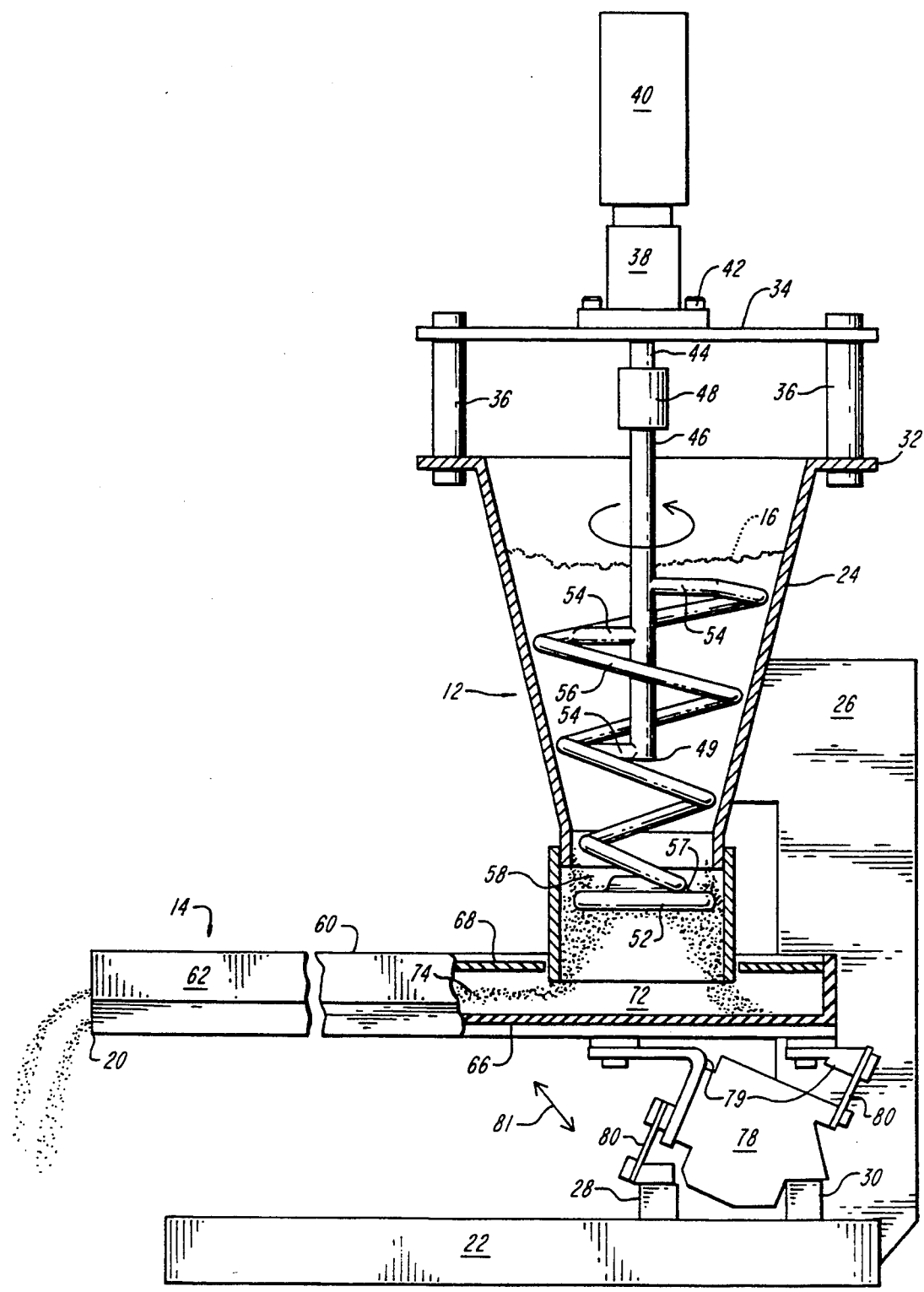
FIG. 1 is a side elevation partially in section illustrating a hopper-feeder system employing a vibratory tray feeder according to this invention.
Figure 2:
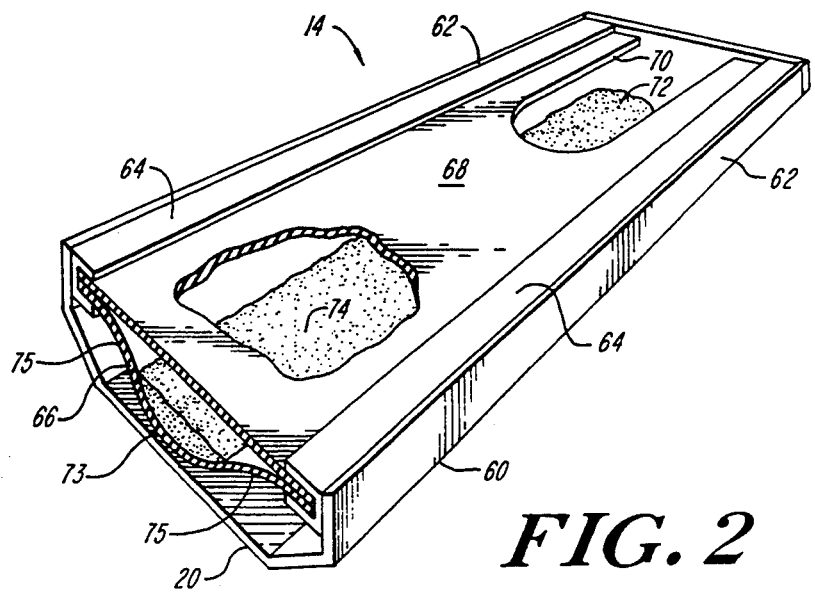
FIG. 2 is a view in perspective of the conveyor frame and flexible conveyor membrane of FIG. 1.

FIGS. 1 and 2 illustrate a hopper-feeder system incorporating the presently preferred embodiment of vibratory tray feeder according to this invention. The system comprises a hopper 12 and a vibratory tray feeder 14, the hopper being adapted for storing particulate powders 16 such as titanium dioxide, vitamins or like particulate solids having a strong tendency to agglomerate. The system is adapted for discharging the powders 16 at a uniform rate. The feeder 14 is adapted to receive the discharged material, to transport it in a stream and to discharge it at a uniform, variable, controlled volume or weight rate at a discharge end 20. The material may fall from the end 20 onto a conveyor or into any desired receiving apparatus for such purposes as processing, packaging or storage.

In this embodiment the hopper and feeder are both supported upon a scale 22, thus forming a loss of weight conveyor system of a type commonly in use. The hopper has a frustoconical wall 24 secured to a stand 26 supported on the scale, and the feeder 14 is supported by shock mounts 28 and 30 on the scale.

The hopper wall 24 is provided at its upper end with an annular flange 32 supporting a frame 34 by means of a plurality of annularly spaced pedestals 36. A reduction gear 38 driven by a variable speed motor 40 is secured by bolts 42 to the frame 34, and has an output shaft 44 coaxial with the axis of the hopper wall 24. On the same axis there is provided an agitator shaft 46 fastened to the shaft 44 by a coupling 48. The shaft 46 extends downwardly to an end 49.

Radially extending from the shaft 46 are a plurality of spokes 54 that are mutually displaced both angularly and longitudinally, all secured and extending at right angles to the shaft 46. These spokes support a convoluted spiral agitator member 56 formed in a generally helical, tapered shape so that the convolutions or turns spiral upwardly and radially outwardly and are in close, non-touching proximity to the inner surface of the hopper wall 24, conforming to its shape. The convolutions extend downwardly to a column cutter or crosspiece 52 welded on the lowest convolution at 57. The crosspiece intersects and extends at right angles to the axis of the shaft 46.

The crosspiece 52 has a lengthwise dimension preferably substantially equal to the diameter of the column of material 58 falling from the hopper.

The motor 40 and reduction gear 38 rotate the agitator shaft 46 at a low speed sufficient only to apply adequate lifting forces to the stored material to dilate and decompress it and effectively oppose its tendency to densify, to become compact and to gain sufficient strength to form a stable arch within the hopper.

The vibratory tray feeder according to this invention comprises a conveyor frame 60 of sheet metal construction formed with integral upstanding side walls 62. Extending along and attached to each of the side walls are side supports forming membrane clamp means 64. A conveyor membrane 66 and a plastic cover sheet 68 have their longitudinally extending edges clamped in the side supports. The cover sheet 68, shown partially broken away in FIG. 2, has an aperture 70 formed to permit a mass 72 of material to fall from the hopper 12 onto the membrane 66. The cover sheet serves to prevent the material on the feeder 14 from escaping to the surroundings, but otherwise has no effect upon the operation of this invention. In operation, the material in the mass 72 continuously forms a stream 74 extending to the discharge end 20.

In the static or non-vibrating condition of the feeder, the cross sectional configuration of the membrane 66 transverse to the longitudinal dimension of the frame 60 is the same throughout the length of the frame. It is horizontal where secured at the side clamp means 64, and curves downwardly and inflects at points 75 to form a central trough 73 as illustrated in FIG. 2.

In this preferred embodiment the membrane 66 is a nonreinforced sheet of a suitable elastomer. Examples include a high mass, low durometer gum rubber and silicone rubber. By "elastomer" is meant a material which at room temperature is flexible and stretchable both longitudinally and laterally of the direction of material flow, and which upon immediate release resumes approximately its original length and shape.

An electromagnetic vibratory drive 78 of conventional form is attached to the frame 60 by brackets 79. The drive is supported on the scale 22 which measures the combined weight of the conveyor frame assembly 60 and the material 72 and 74 resting upon the membrane 66, in addition to the entire hopper assembly shown in FIG. 1. The conveyor frame assembly comprises a tuned system having the combined mass of the conveyor frame assembly 60, the membrane 66 and the materials 72 and 74, and leaf springs 80 that determine the natural frequency of the feeder. The excitation for driving the system has three primary parameters, namely, the drive angle represented by arrows 81 having the direction in which the force is applied to the conveyor frame for vibrating it, and the frequency and amplitude of the vibrations. For a particular feeder the drive angle is fixed by the design and is typically 45 degrees from the horizontal. The natural frequency of the feeder, being a function of the material load, is subject to any variations therein. The frequency of the drive unit 78 is ordinarily somewhat below the natural frequency and is typically 60 Hz. The amplitude of the vibrations is variable and determines the rate of feed of the stream 74.

Referring to FIG. 2, the material stream 74 is concentrated in the central region of the membrane 66 as it flows toward the discharge end 20.

Figure 3:
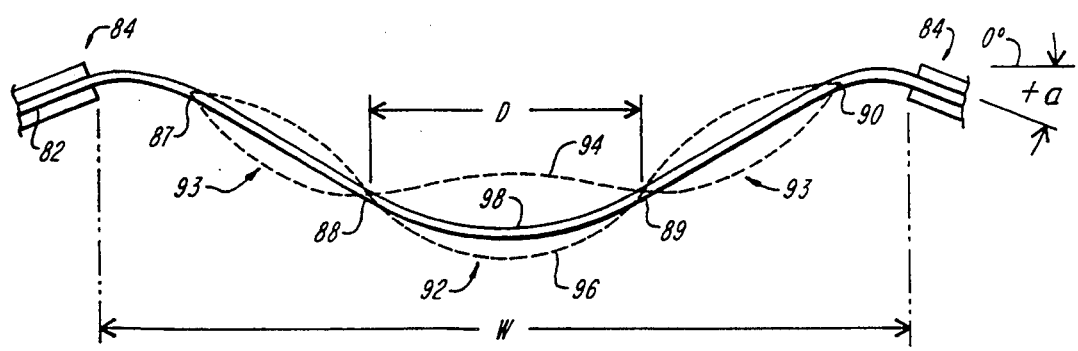
FIG. 3 is a drawing of an experimental flexible conveyor membrane structure illustrating the cross sectional configuration transverse to the material movement direction, for purposes of explanation.

FIG. 3 illustrates an experimental apparatus used to determine the preferred parameters associated with the membrane 66 to achieve a steady flow of material without agglomeration, adhesion or buildup on the membrane. The apparatus includes a conveyor membrane 82 having the same configuration as the membrane 66. FIG. 3 is an end view from the end corresponding to the discharge end 20 of FIG. 2, and shows the configuration of the membrane in a plane transverse to the flow direction of the material stream. In FIG. 3 clamp means 84 are similar to the clamp means 64 of FIG. 2, except that they are adapted to clamp the side edges of the membrane 82 at adjustable, varying angles "a" to the horizontal.

In experiments it was noted that when the membrane 82 was vibrated by forces on the frame 60 in the direction of the arrows 81 in FIG. 1, the membrane developed standing waves having four nodes 87, 88, 89 and 90 with a central region 92 and two side regions 93 between the nodes each effecting periodic, alternately inverting flexures as shown by broken lines 94 and 96.

It was further observed that the amplitudes of the excursions of the membrane in the regions 92 and 93 between the nodes were functions of the angle "a." Moreover, the uniformity of material flow as well as the elimination of agglomeration and sticking to the membrane were also functions of the angle "a." Substantially improved, uniform material flow combined with substantial excursion of the central region 92 of the membrane occurred at angles of "a" equal to zero, plus or minus 10 degrees measuring clockwise and counterclockwise from the horizontal, respectively, as shown in the drawing. At angles of "a" substantially greater than minus 10 degrees, the performance of the membrane fell off markedly and increased agglomeration and adhesion to the membrane were observed. Within these limits of the angle "a", in the non-vibrating or static condition the membrane is locally supported as a cantilever at each side edge, and has sufficient stiffness to produce upwardly convex curvatures. These curvatures terminate at points of inflection defining a trough 98 similar to the trough 73 having a downwardly convex curvature.

The foregoing observations led to the adoption of the presently preferred embodiment of FIGS. 1 and 2 wherein the angle "a" is chosen to be zero degrees.

According to this invention, the cross sectional configuration of the membrane transverse to the direction of material flow, in the static or non-vibrating condition, exhibits points of inflection at which the direction of curvature reverses from upwardly convex to downwardly convex. With the membrane initially in this configuration, excitation readily develops the standing waves illustrated in FIG. 3 in both the loaded and unloaded conditions.

The improvements in material flow properties described above are further enhanced with membranes having stretchable properties. The alternate stretching and contraction of the membrane at its surfaces aids in fracturing and shedding layers or skins of material tending to adhere to the surfaces.

Reinforcements may be incorporated in the membranes of this invention, restricting their ability to stretch longitudinally or laterally of the frame 60, or in both directions.

EXAMPLE

Referring to FIG. 3, a sheet of gum rubber having a modulus of elasticity of about 250 psi (17.578 kg per cm$^2$), a mass of 0.00437 pound per square inch (0.307 g. per sq. cm), having a uniform thickness of 0.125 inch (3.175 mm) and a width of 6.25 inch (158.875 cm), was clamped at the edge margins between clamp means 84 separated by a distance W of 5.125 inches (13.018 cm). The clamp means 84 were rotated so that the membrane at the side extremities formed an angle "a" of zero degrees measured from the horizontal. Titanium dioxide powder was successfully fed through the apparatus in a uniform stream 74 having a loading of 0.045 pound per inch (8.036 gm per cm) on the membrane. Under no load, the distance D between the nodes 88 and 90 was observed to be 1.5 inch (38.1 mm).

We claim:

1. A vibratory feeder for particulate solids comprising, in combination, a feeder support, a rigid conveyor frame flexibly mounted on the support and having a pair of longitudinally extending side supports, each side support including longitudinally extending clamp means, a conveyor membrane of flexible sheet material having longitudinally extending side edges each clamped to a side support by the clamp means and being freely suspended therebetween, the membrane adjacent each clamp means being supported as a cantilever with upwardly convex curvature and having sufficient stiffness to form longitudinally extending curvature inflections inwardly spaced from the clamp means and a longitudinally extending, downwardly convex central trough between said inflections for retaining and conveying said solids, means to deliver solids to said trough at a first location thereon, a vibrator adapted to vibrate the conveyor frame with components of motion both vertical and longitudinal thereto, and means to energize the vibrator at a frequency causing said trough to perform periodic alternating inversions of flexure.

2. A feeder according to claim 1, in which the conveyor membrane comprises a nonreinforced sheet of elastomeric material.

3. A feeder according to claim 1, in which the sheet material is stretchable in the direction lateral to the conveyor frame.

4. A feeder according to claim 1, in which the sheet material is stretchable longitudinally of the conveyor frame.

5. A feeder according to claim 1, in which the sheet material is stretchable both longitudinally and laterally of the conveyor frame.

6. A feeder according to claim 1, in which the vibrator operates at a frequency causing said transverse configuration to form three standing resonance waves between four nodes, the portions of the membrane between said nodes effecting periodic alternately inverting flexures.

* * * * *